United States Patent [19]
Johnstone

[11] 3,974,986
[45] Aug. 17, 1976

[54] AIRCRAFT WING VORTEX DEFLECTOR

[76] Inventor: Edmund H. Johnstone, 82 Salzburg Blvd. Apt. G, Columbus, Ind. 47201

[22] Filed: Nov. 25, 1974

[21] Appl. No.: 526,531

Related U.S. Application Data

[63] Continuation-in-part of Ser. No. 364,685, May 29, 1973, abandoned.

[52] U.S. Cl. ............................ 244/40 R; 244/130
[51] Int. Cl.² .................................. B64C 21/02
[58] Field of Search ............... 244/40 A, 40 R, 41, 244/130; 416/91, 92, 231

[56] References Cited
UNITED STATES PATENTS

| | | | |
|---|---|---|---|
| 2,075,817 | 4/1937 | Loerke | 244/130 |
| 2,406,921 | 9/1946 | Stalker | 244/40 R |
| 2,406,923 | 9/1946 | Stalker | 244/40 R |
| 3,596,854 | 8/1971 | Haney, Jr. | 244/40 A |

*Primary Examiner*—Stephen G. Kunin
*Assistant Examiner*—Barry L. Kelmachter
*Attorney, Agent, or Firm*—Oltsch & Knoblock

[57] ABSTRACT

An aircraft wing vortex deflector constituting means for intercepting at least a part of the spiral flow of air around the tips of the wings during flight and directing the intercepted air rearwardly in a manner and direction tending to dissipate vortices in the wake of the aircraft.

2 Claims, 9 Drawing Figures

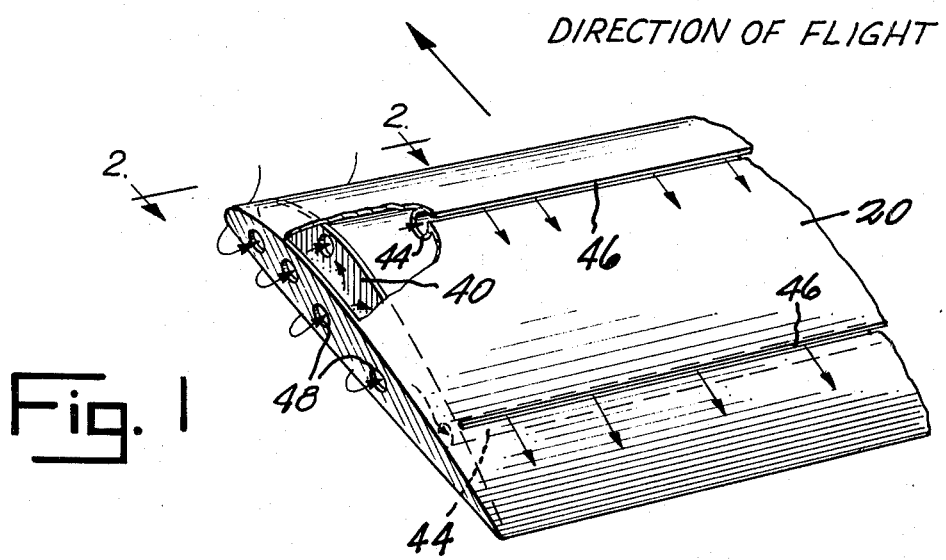
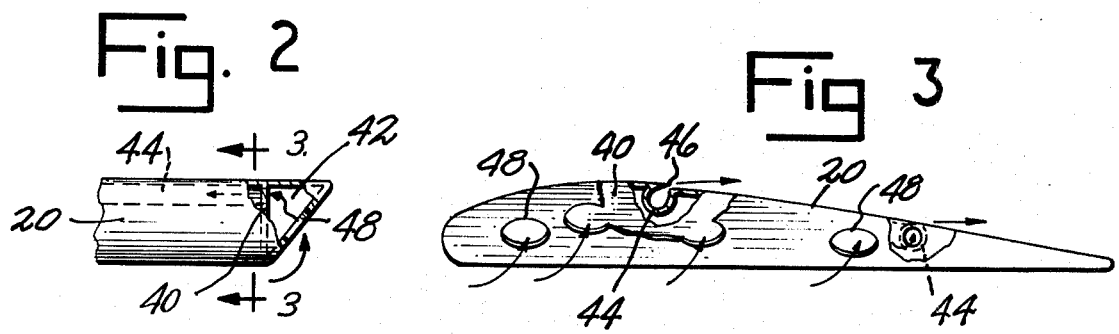
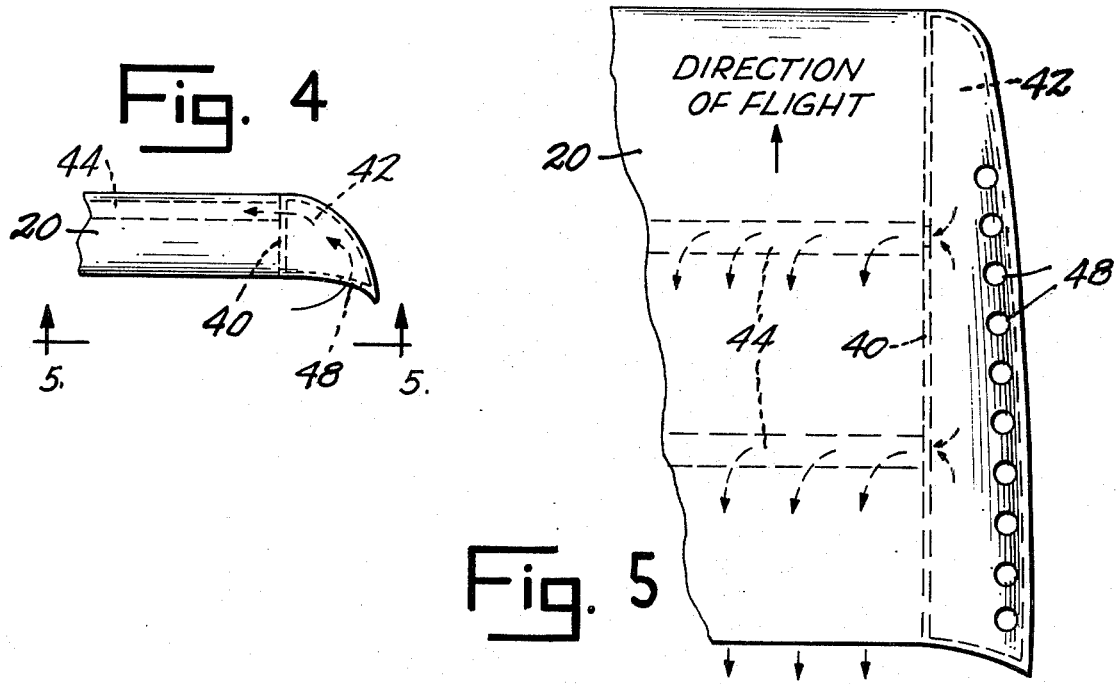

AIRCRAFT WING VORTEX DEFLECTOR

This invention relates to aircraft wing vortex deflectors and is a continuation-in-part of my copending application Ser. No. 364,685, filed May 29, 1973, now abandoned.

The flight of aircraft generates vortices at the wing tips. Such vortices are the result of the flow of air around the wing tip, that is, usually from bottom to top thereof, and with a lateral component relative to the direction of travel or flight of the craft. Such vortices persist in the wake of the flight of aircraft for an appreciable period of time before they are dissipated. The wake or vortices or turbulence of a craft are characterized by counter-rotating spirals of air currents which appear to behave much like horizontal tornadoes. Aircraft flying in the vortex wake of a large commercial or military transport can be subjected to unexpected rolling effects or downdrafts due to these air currents with resulting dangerous effects. The dangers or hazards are greatest at low altitudes adjacent to airports and landing fields in the approach pattern or path of incoming aircraft, because at such locations aircraft density may be high, the space in which an incoming craft may maneuver is limited, and the characteristic slower speeds of incoming or landing aircraft appear to miximize the vortices. Investigations have revealed that the hazards resulting from wake turbulence are substantial and serious, and a substantial number of accidents investigated in recent years have been attributed to vortex turbulence, or are suspected of being caused by such vortex turbulence.

Prior efforts to overcome, deflect or dissipate the adverse effects of wing tip vortices have been made, but have been subject to disadvantages and limitations. Thus Loerke U.S. Pat. No. 2,075,817 discloses several constructions, each of which has a disadvantage or limitation, such as requirement for a venturi tube open at the wing tip, creating air resistance in flight, or a requirement for a suction pump to draw air from the wing tip and through the wing, or a requirement for an appended structure external of and at the rear of each wing tip portion creating air resistance in flight. Stalker U.S. Pat. Nos. 2,406,921 and 2,049,572 disclose a propeller or a blower and operating means therefor to draw air from one chamber in the wing to another chamber and a discharge outlet.

It is the primary object of this invention to provide simple and inexpensive means by which vortices generated at the wing tips of aircraft during flight may be deflected, scattered and reduced in their seriousness and effect without reliance upon supplemental means to produce pressure gradients in flight.

A further object is to provide means responsive solely to wing-air reactions in flight for altering vortexforming flow of air around the wing tips of an aircraft to direct at least portions thereof from spiral flow in a manner and direction tending to dissipate the vortices.

A further object is to provide a device of this character which relies solely on the angular momentum and velocity of wing tip vortices to produce a pressure gradient to cause air to flow through vortex deflector means.

A further object is to provide a device of this character having means responsive solely to the reaction of an aircraft wing in flight to collect at least a part of air tending normally to flow in a manner to form a vortex around the wing tip during flight and to direct and convey the collected air toward the trailing edge of the wing in a vortex-dissipating direction.

Other objects will be apparent from the following specification.

FIG. 1 is a fragmentary perspective view of an aircraft wing with parts broken away illustrating one embodiment of the invention.

FIG. 2 is a fragmentary view taken along lines 2—2 in FIG. 1.

FIG. 3 is a sectional view taken on line 3—3 of FIG. 2.

FIG. 4 is a fragmentary front view of slightly modified form as seen along lines 2—2 of FIG. 1.

FIG. 5 is a fragmentary bottom plan view as seen on lines 5—5 of FIG. 4.

Figure 6:
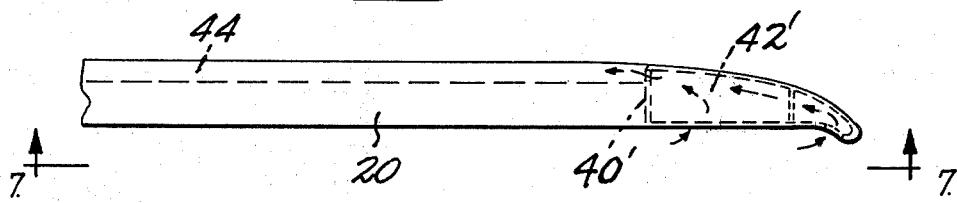
FIG. 6 is another view of a form as viewed at lines 2—2 of FIG. 1.

Referring to the drawings which illustrate the preferred embodiments of the invention, and, particularly to FIGS. 1 to 9 which illustrate one embodiment of the invention, the numeral 20 designates a wing or air foil of an airplane of any conventional type and construction. The airfoils or wings 20 each are provided with a continuous uninterrupted leading edge and an aileron 24. The airplane is provided with the usual propulsion means and controls (not shown).

During flight, the flow of air adjacent the tips of the wings 20 is characterized by lateral flow components, i.e. spirally from the under surface upwardly around the wing tips and across the upper surfaces of the wings. These spiral flows of air produce substantially horizontal vortices along the line of flight at both wing tips of the craft. The vortices persist for an appreciable time in the wake of the flight of the craft, normally continuing from 2 or 3 minutes to as long as 15 minutes, depending upon aircraft configuration and atmospheric conditions. These turbulent wakes or vortices, particularly as formed by large commercial or military transport aircraft, can subject aircraft flying in or through them to unexpected rolling effects or downdrafts which can present serious problems for such following aircraft, particularly at low altitudes, as on approaches to landing. The present invention provides means to interrupt the continuity of the spiral air flow and to deflect or divert at least some of such flow so as to scatter or dissipate the force thereof and render the turbulent conditions created by wing tips weaker and less hazardous to following aircraft.

In the embodiments of the invention illustrated in FIGS. 1 to 9 the interior of the wing 20 at its tip is spanned by a longitudinal interior partition 40 extending from the leading edge to the trailing edge of the wing and defining an elongated chamber 42. One or more conduits or passages 44 communicate with the chamber 42 and extend inboard therefrom, preferably in the upper portion of the wing. Each conduit is provided with one or more outlet openings 46 extending through the upper wing-defining surface member to a discharge-directing member 46 opening rearwardly, that is, opening toward the trailing edge of the wing. The outlets 46 may be defined by upwardly offset portions merging with the upper wing surface forming members at the front and sides thereof and providing a discharge outlet at the rear thereof. The lower portion of the wing which outlines a part of each chamber 42 is provided with a plurality of inlet openings 48 spaced apart along the length of the chamber 42 into which enters some of the air normally tending to flow around the wing tip in vortex-forming direction. The entry of air at openings 48 dissipates or reduces the tendency of flight of the craft to generate a vortex. The air so entering the chamber during flight flows through the passage or passages 44 solely in response to reaction of the wing in flight and is discharged rearwardly across the top of the airfoil. The location of the discharge-directing members 46 may be adjacent to the chamber and at a location within the range of the normal vortex dimension generated by the wing tip so that the discharge reduces the force of the vortex and tends to scatter or dissipate it.

Figure 8:
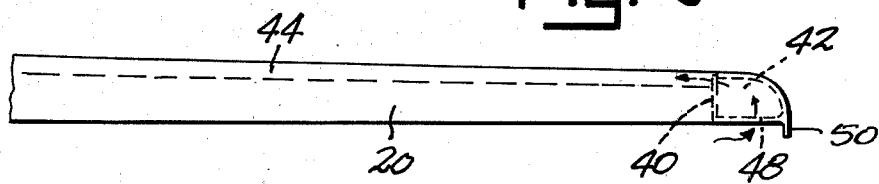
FIG. 8 is another view as seen on line 2—2 of FIG. 1.
Figure 9:
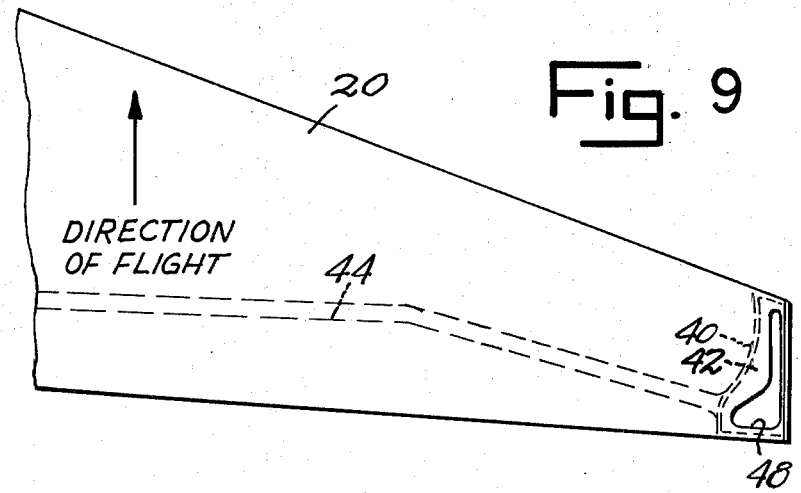
FIG. 9 is a fragmentary bottom plan view of the construction shown in FIG. 8.

This arrangement may be supplemented by the provision of a longitudinal deflector plate, such as a deflector plate 50, projecting downwardly from the wing tip outwardly of the air inlet holes 48, as illustrated in FIG. 8.

In some instances, wings are provided with so-called "drooped" tips, that is, a tip portion which projects downwardly at the bottom wing surface. In such instances the provision of a deflector plate at the wing tip is not necessary, and a similar effect is produced by the downward projection of the bottom surface of the wing tip when the inlet openings 48 are spaced inwardly from the wing tip, as illustrated in FIG. 4.

Figure 7:
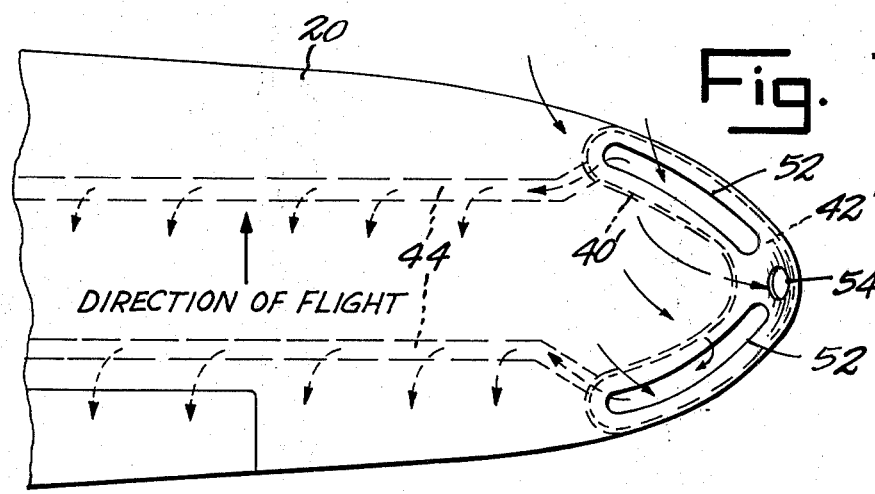
FIG. 7 is a fragmentary bottom plan view as viewed on lines 7—7 of FIG. 6.

Another variant or embodiment of the invention employing a chamber within the wing tip, which is particularly well suited for aircraft having wings with curved or elliptical tips, is illustrated in FIGS. 6 and 7. In this construction, the partition 40' is curved in substantial conformity with the curvature of the outer edge of the wing tip, thereby providing a chamber 42' which is of substantially C-shape or outline. The inlet openings in such a construction may include one or more elongated curved inlet slots 52 extending lengthwise of chamber 42' and one or more holes 54 which may be located between and adjacent to the slots.

In all of the embodiments of this invention, means are provided for deterring the development and continuity of aircraft wing tip spiral vortices. These deterrent means may be effective to reduce the strength, severity, intensity and persistence of vortices and of wake turbulence at points at or adjacent to the aircraft and to scatter and break up the vortices so that long continuance of the resistance and hazardous characteristics of the vortices is reduced. At the same time, the deterrent means are so designed and characterized that minimum adverse effects with respect to power consumption, flight characteristics, airfoil lift characteristics, and aircraft weight, cost and economy are experienced.

While the preferred embodiments of the invention have been illustrated and described, it will be understood that changes in the construction may be made within the scope of the appended claims without departing from the spirit of the invention.

What I claim is:

1. In an aircraft, in combination, wings each having a continuous uninterrupted leading edge and a tip portion, each wing producing a lifting airfoil reaction during flight and each tip portion being characterized by flow of air therearound in a spiral path defining vortices in the wake of the wing tip during flight, and deflector means located at the tip portion of each wing and effective to intercept and receive at least a part of the vortex-tending air flow as it occurs at the wing tip during flight and divert the received air flow rearwardly of the direction of flight, said deflector means being confined within the wing and including a chamber within the tip portion of each wing, said chamber being elongated substantially in the direction of flight, air inlet means at each wing tip portion rearwardly of said leading edge occurring along the length of and communicating with said chamber, said inlet means being located below the top surface of the wing to intercept and receive some of said air vortices occurring at each wing tip, and air outlet means at each wing communicating with said chamber and discharging rearwardly during flight, said deflector means functioning to intercept some air from said air vortices for flow through said inlet means and chamber for discharge at said outlet means only in response to the angular momentum and velocity of said wing tip vortices occurring at each wing tip and to the flow of air over each wing during flight.

2. The construction defined in claim 1, wherein said elongated chamber extends fore and aft within each wing tip portion, said air inlet means constituting a plurality of openings at the lower part of the wing tip portion and spaced apart substantially in the direction of flight, and said air outlet means including a conduit within the wing communicating with and extending inboard from said chamber to a discharge opening extending lengthwise of and at the top of the wing to direct air from said conduit toward the trailing edge of the wing.

* * * * *